United States Patent [19]

Widinski et al.

[11] Patent Number: 4,830,238

[45] Date of Patent: May 16, 1989

[54] CARRYING DEVICE

[75] Inventors: Paul R. Widinski, Arvada; Glenn N. Taylor, Longmont, both of Colo.

[73] Assignee: Health & Home Products, Inc., Longmont, Colo.

[21] Appl. No.: 34,704

[22] Filed: Apr. 6, 1987

[51] Int. Cl.⁴ .................. B60R 11/00; B65D 33/14
[52] U.S. Cl. ................ 224/42.46 R; 224/92.41; 383/6; 383/24; 383/26
[58] Field of Search ............... 224/148, 42.46 R, 235, 224/236, 42.41, 42.46 A, 42.46 B, 182, 219–222, 254, 255, 267; 383/6, 24, 27, 38, 40, 30, 31; 206/805

[56] References Cited

U.S. PATENT DOCUMENTS

| 462,575 | 11/1891 | McMurray et al. | 224/42.46 R |
| 1,176,598 | 3/1916 | Pollgreen | 224/42.46 R X |
| 1,208,109 | 12/1916 | Decker | 224/42.46 R |
| 1,291,914 | 1/1919 | Kelley | 383/40 |
| 1,480,406 | 1/1924 | Mashek | 224/42.46 B |
| 1,708,906 | 4/1929 | Sparks et al. | 224/42.46 R |
| 1,728,365 | 9/1929 | Root et al. | 224/222 |
| 1,994,827 | 3/1935 | Mayer | 383/38 X |
| 2,320,415 | 6/1943 | Dalloz | 383/31 |
| 2,533,829 | 12/1950 | Merryweather | 383/24 X |
| 2,533,850 | 12/1950 | Syracuse | 383/38 X |
| 2,671,671 | 3/1954 | Kupfer | 224/42.46 R X |
| 2,704,098 | 3/1955 | Pocock | 383/38 X |
| 2,911,130 | 11/1959 | Kitazono | 224/42.44 |
| 2,980,313 | 4/1961 | Quinn | 383/30 X |
| 3,930,578 | 1/1976 | Stein | 206/805 X |
| 4,512,504 | 4/1985 | Owlett | 224/42.46 R |

Primary Examiner—Henry J. Recla
Assistant Examiner—Robert Fetsuga
Attorney, Agent, or Firm—Emrich & Dithmar

[57] ABSTRACT

A carrying device for retaining articles on the handle of a mobile apparatus comprising, an elongated elastic member for placement on the handle, and a pocket assembly having a plurality of pockets depending from the elastic member for retaining the articles.

13 Claims, 2 Drawing Sheets

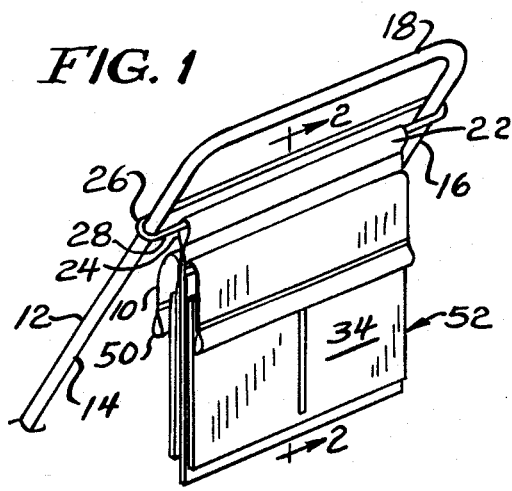
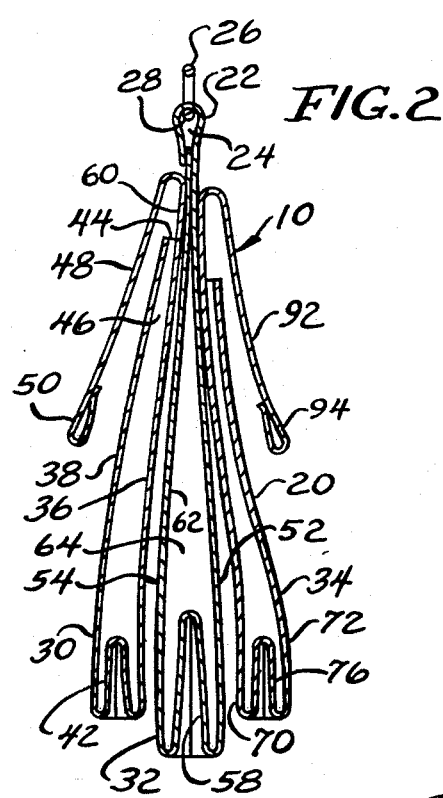

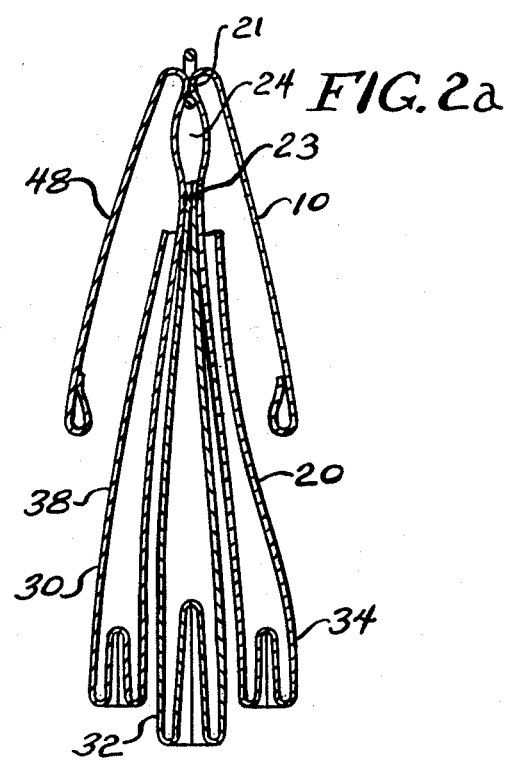

CARRYING DEVICE

BACKGROUND OF THE INVENTION

The present invention relates to a carrying device for a mobile apparatus.

Mobile apparatii, such as strollers for infants, are well known. Such strollers typically have a carriage with wheels to hold the infant, and a handle attached to the carriage with a pair of upwardly extending bars and an outer cross bar connecting the upwardly extending bars for pushing and manipulating the carriage. Although such strollers are convenient for the parent in moving the infant, it is often necessary for the parent to hand carry various articles for infant care, such as diapers, since there is normally insufficient room in the carriage to retain the articles with the infant in place.

SUMMARY OF THE INVENTION

A principal feature of the present invention is the provision of a carrying device for retaining articles on the handle of a mobile apparatus.

The carrying device of the present invention comprises, an elongated elastic member comprising a loop, and a pocket assembly having a plurality of pockets depending from the elastic member.

A feature of the present invention is that the elastic member may be stretched and placed on the handle for retaining the carrying device in place on the handle of the mobile apparatus.

Another feature of the invention is that various articles may be placed in the pockets of the pocket assembly.

Yet another feature of the invention is that the pockets have different configurations in order to retain different types of articles in the carrying device.

Still another feature of the invention is that the pocket assembly has one or more flaps to cover openings of the pockets while retaining articles in the pockets.

Further features will become more fully apparent in the following description of the embodiments of this invention and from the appended claims.

DESCRIPTION OF THE DRAWINGS

In the drawings:

FIG. 1 is a fragmentary perspective view showing a carrying device as placed on the handle of a mobile apparatus, such as a stroller;

FIGS. 2 and 2a are sectional views of slightly modified forms taken substantially as indicated along the line 2—2 of FIG. 1;

FIG. 3 is a perspective view of a pocket in a pocket assembly of the carrying device of FIG. 1;

FIG. 4 is a fragmentary perspective view of another pocket for retaining one type of article;

FIG. 5 is a fragmentary perspective view of the pocket of FIG. 4 for retaining another type of article; and FIG. 6 is a perspective view of another pocket for the pocket assembly.

DESCRIPTION OF THE PREFERRED EMBODIMENTS

Referring now to FIGS. 1, 2 and 2a, there is shown a carrying device generally designated 10 for placement on a mobile apparatus, such as a stroller for infants. The stroller typically has a carriage (not shown) on wheels for retaining and moving an infant, and a handle 12 with a pair of spaced upwardly extending bars 14 and 16 and an outer cross bar 18 connecting the bars 14 and 16.

The carrying device 10 comprises a pocket assembly 20 having an upper flap 22 defining a channel 24 extending the width of the pocket assembly 20, as shown in FIG. 2; the embodiment of FIG. 2a has a pair of spaced seals 21 and 23 defining the channel 24. The carrying device 10 has an elongated endless elastic member 26 formed in a loop, such as rubber, with one reach 28 of the elastic member 26 being received in the channel 24. Thus, the elastic member 26 may be expanded and placed over the bars 14 and 16 of the handle 12 in order to retain the pocket assembly 20 on the handle 12 during use of the stroller. The pocket assembly may be constructed from a suitable plastic material, such as polyethylene or polyvinyl chloride.

The pocket assembly 20 has a plurality of pockets 30, 32, and 34 depending from the elastic member 26. With reference to FIGS. 2 and 3, the pocket 30 has a back sheet 36 extending the width of the pocket assembly 20, and a front sheet 38 extending the width of the back sheet 26. Opposed sides 40a and 40b of the front sheet 38 are connected to the back sheet 36, with the pocket 30 having a lower indentation 42 connecting the lower portion of the front sheet 38 to the lower portion of the back sheet 36 to permit expansion of the pocket 30. The front sheet 38 defines an upper opening 44 extending substantially the width of the back sheet 36 and communicating with a pouch 46 intermediate the front sheet 38 and back sheet 36 to receive suitable articles, such as diapers. The pocket 30 has a flap 48 extending from an upper portion of the back sheet 36 for placement over an upper portion of the front sheet 38 in order to close the opening 44 during use of the device, with the flap 48 preferably having an outer doubled end portion 50.

With reference to FIGS. 2, 4, and 5, the second pocket 32 has a back sheet 52 extending the width of the pocket assembly 20, and a front sheet 54 extending the length and width of the back sheet 52. Opposed sides 56a and 56b of the front sheet 54 are connected to the back sheet 52, and the pocket 32 has a lower indentation 58 connecting the lower end of the back sheet 52 and the lower end of the front sheet 54 to permit expansion of the pocket 32. An upper portion 60 of the front sheet 54 is connected to the back sheet 52. As shown, the front sheet 54 has a generally centrally located rectangular opening 62 spaced from the sides 56a and b, and spaced from the lower portion of the front sheet 54 and the upper portion 60 of the front sheet 54. The front sheet 54 and back sheet 52 define a pouch 64 communicating with the opening 62 in order to retain articles in the pouch 64. As shown in FIG. 4, a box 66 of tissues may be placed through the opening 62 into a lower portion of the pouch 64 to retain the box 66 in place for removal of the tissues from the box 66 through the opening 62. In an alternative form, as shown in FIG. 5, a roll 68 of toilet paper may be placed through the opening 62 into a lower portion of the pouch 64, such that the roll 68 will unroll in the pouch 64 while removing paper from the roll 68 through the opening 62.

With reference to FIGS. 2 and 6, the pocket 34 has a back sheet 70 extending the width of the pocket assembly 20. The pocket 34 has a front sheet 72 extending the width of the back sheet 70, and having opposed sides 74a and 74b connected to the back sheet 70. The pocket 34 has a lower indentation 76 connecting the lower ends of the front sheet 72 and back sheet 70 to permit expansion of the pocket 34. The front sheet 72 has a vertical line 78, such as a heat seal line, connecting the front sheet 72 to the back sheet 70 from a lower portion of the front sheet 72 to an upper edge of the front sheet 72, such that the front sheet 72 defines a pair of openings 80 and 82 communicating with a pair of respective pouches 84 and 86 to receive articles, such as a baby bottle 88 and soiled tissue paper 90 in the separate pouches 84 and 86. The pocket 34 may have a flap 92 extending from an upper portion of the back sheet 70 for placement over an upper portion of the front sheet 72 in order to close the openings 80 and 82, and, if desired, the flap 92 may have a doubled outer end portion 94.

Thus, in accordance with the present invention, the carrying device has an elastic member for securing the carrying device over the handle of a stroller for an infant. The carrying device has a pocket assembly to retain a plurality of articles for use with the infant, and the articles are thus retained in a convenient location and convenient manner for use on the infant.

The foregoing detailed description is given for clearness of understanding only, and no unnecessary limitations should be understood therefrom, as modifications will be obvious to those skilled in the art.

What is claimed is:

1. A carrying device for retaining articles on the handle of a mobile apparatus, comprising:
   an elongated elastic member for placement on the handle; and
   a pocket assembly having a plurality of pockets depending from the elastic member for retaining the articles wherein one of the pockets comprises a back sheet, and a front sheet having opposed sides and a lower portion connected to the back sheet, with said front sheet having a centrally located generally rectangular aperture therethrough spaced from the sides and lower portion of the front sheet to receive articles.

2. The device of claim 1 wherein the elastic member extends from opposed ends of the pocket assembly.

3. The device of claim 1 wherein the elastic member comprises a loop, and including means for retaining the elastic member to an upper portion of the pocket assembly.

4. The device of claim 3 wherein the pocket assembly includes a channel extending through an upper portion thereof to receive a reach of the loop of the elastic member.

5. The device of claim 1 wherein one of the pockets comprises a back sheet, and a front sheet having opposed sides and a lower portion connected to the back sheet and defining an upper opening to receive articles.

6. The device of claim 5 including an upper flap extending from the back sheet to cover said opening.

7. The device of claim 1 wherein the aperture is spaced from an upper portion of the front sheet.

8. The device of claim 1 wherein an upper portion of the front sheet is connected to the back sheet.

9. The device of claim 1 wherein one of the pockets comprises a back sheet, and a front sheet having opposed sides and a lower portion connected to the back sheet, said front sheet having a line of attachment extending from the lower portion of the front sheet toward an upper portion of the front sheet to define a pair of spaced openings to receive articles.

10. The device of claim 7 including a flap extending from the back sheet to cover the openings.

11. The device of claim 1 wherein the pockets comprise a back sheet and a front sheet connected to the back sheet, with said pockets having a lower upwardly extending indentation between the back sheet and front sheet and extending substantially the width of the back sheet and front sheet to permit expansion of the pockets.

12. A carrying device for retaining articles on the handle of a mobile apparatus, comprising:
   an elongated elastic member having a loop; and
   a pocket assembly having a plurality of pockets and a channel extending through an upper portion thereof to receive a reach of the loop of the elastic member, a first of said pockets having a back sheet, and a front sheet having opposed sides and a lower portion connected to the back sheet and defining an upper opening to receive articles, a second of said pockets having a back sheet, and a front sheet having opposed sides and a lower portion connected to the back sheet, with the front sheet having a generally central aperture therethrough spaced from the sides, the lower portion, and an upper portion of the front sheet to receive articles, and a third of said pockets having a back sheet, and a front sheet having opposed sides and a lower portion connected to the back sheet, said front sheet having a line of attachment extending from the lower portion of the front sheet toward an upper portion of the front sheet to define a pair of spaced openings to receive articles.

13. The device of claim 10 wherein the pockets have a lower upwardly extending indentation between the front sheet and back sheet and extending substantially the width of the back sheet and front sheet to permit expansion of the pockets.

* * * * *